United States Patent [19]

Cardell et al.

[11] 4,274,746
[45] Jun. 23, 1981

[54] METHOD AND APPARATUS FOR OPTICALLY MEASURING CRIMP FREQUENCY

[75] Inventors: Max L. Cardell, Shelby; John R. Holt, Charlotte, both of N.C.

[73] Assignee: Fiber Industries, Inc., New York, N.Y.

[21] Appl. No.: 118,260

[22] Filed: Feb. 4, 1980

[51] Int. Cl.³ .................... G01N 21/86; G01N 21/89
[52] U.S. Cl. ................................ 356/429; 250/571; 250/572; 356/431
[58] Field of Search ............... 356/238, 429–431, 356/446; 250/571, 572, 559

[56] References Cited

U.S. PATENT DOCUMENTS

| | | | |
|---|---|---|---|
| 3,536,409 | 10/1970 | Belser et al. | 356/238 |
| 3,543,360 | 12/1970 | Fertig | 356/430 X |
| 4,019,066 | 4/1977 | Lucas et al. | 356/429 X |
| 4,057,350 | 11/1977 | Craig | 356/429 |
| 4,093,866 | 6/1978 | Kasdan et al. | 356/431 X |
| 4,102,578 | 7/1978 | Suzuki | 356/429 X |

Primary Examiner—John K. Corbin
Assistant Examiner—Bruce Y. Arnold
Attorney, Agent, or Firm—Roderick B. Macleod

[57] ABSTRACT

The primary crimp frequency of crimped material is optically measured by utilizing the pattern of light reflections produced by the waviness of the material. The material is illuminated from one end thereof with light striking the material at a shallow angle to produce a pattern of bright and shadowed areas on the material. The light pattern is scanned by a reticon camera and an amplitude modulated output signal corresponding to the light pattern is obtained. The frequency of the output signal is measured to provide an indication of crimp frequency.

20 Claims, 13 Drawing Figures

Fig. 1

Fig. 3A — CAMERA OUTPUT PULSES

Fig. 3B — SAMPLE AND HOLD

Fig. 3C — FILTERED SIGNAL

Fig. 4 — SINGLE SCAN CONTOUR SIGNAL

Fig. 5 — CONTOUR SIGNAL / DERIVATIVE DETECTOR OUTPUT SIGNAL

METHOD AND APPARATUS FOR OPTICALLY MEASURING CRIMP FREQUENCY

BACKGROUND OF THE INVENTION

The present invention relates to a method and apparatus for measuring the crimp frequency in crimped tow or yarn, and more particularly to such a method and apparatus which is suitable for use in an automatic on-line, or in situ, operation.

In modern fiber technology, a number of continuous man-made fiber filaments are gathered together in loose, rope-like form to make a large strand of material, commonly referred to as "tow". The tow is cut into suitable lengths as staple and processed on a spinning system. The loose filaments in the tow are usually held together by means of crimp which is placed in the tow during a fiber texturing process. In addition to holding the filaments of the tow together, the crimp also serves to add bulk to the material.

The crimp frequency of tow is a definition of the waviness of the fiber and is expressed in terms of crimps per unit length, e.g. crimps per inch. The measurement of crimp frequency can be used as a quality control step in determining the texture of the fiber being processed.

In the past, the measurement of crimp frequency has been carried out off-line in a laboratory by an operator using a scaled ruler and a tensioning device. A predetermined tension is placed on a representative sample of the tow to remove low frequency secondary crimp therefrom, and the ruler is layed on top of the tow. The operator visually counts the number of crimps in a unit length of the tow, such as one inch, for example, to determine the crimp frequency of the tow.

Since this prior art method for measuring crimp frequency is an off-line operation, the difference between the time when the crimp frequency of tow being produced goes outside of predetermined control limits and the time when this deviation can be detected is substantial and often unsatisfactory, and may result in wasted material. In addition, the visual inspection of each measured tow sample by an operator is subject to frequent error and is a very tedious operation which seriously limits the amount of testing that can be performed by a single operator.

One proposed method for automatically evaluating the properties of crimp in a crimped tow or yarn is disclosed in U.S. Pat. No. 3,333,467. In the operation of the apparatus disclosed in this patent, a tension sufficient to substantially straighten the bends in the tow is placed on the tow by tensioning rollers. The tow is then passed between two relaxing rollers which reduce the tension on the tow, allowing the crimp in the tow to recover and maintain a tension on the tow. The magnitude of this tension is sensed by a tension-sensing roller, to provide an indication of the crimp angle, crimps per inch and modulus of elasticity of the fiber comprising the tow. The method and apparatus proposed by this patent are not entirely satisfactory, since they are not capable of measuring crimp frequency per se. Rather, crimp frequency can only be detected in conjunction with the other above-mentioned factors affecting the tension of the tow. In addition, the speed ratio of the relaxing rollers to the tensioning rollers has an effect upon the measurement; and therefore may not provide uniform results during different testing operations.

Another proposed method for measuring crimp frequency is disclosed in U.S. Pat. No. 4,057,350. In the operation of the apparatus disclosed in this patent, a crimped fiber is placed within a specimen cell and a laser beam is passed through the cell while the cell is moved in a direction transverse to the beam and lengthwise of the fiber. Each crimp in the fiber deflects the laser beam and the deflections are received as pulses of light by a photodetector. The photodetector actuates a counter to provide a count indicative of the number of crimps in the fiber. Although the apparatus disclosed in this patent is capable of measuring crimp frequency per se, it is only capable of detecting the crimp frequency in a single strand of fiber. It is not adapted for use with a strand of tow comprising a large number of filaments, and is therefore not suitable for on-line use during the production of tow. In addition, the need for laser light renders the frequency measurement system of this patent economically unfeasible.

It is therefore a general object of the present invention to provide a novel method and apparatus for measuring the crimp frequency of crimped tow.

It is another object of the present invention to provide a novel method and apparatus for automatically measuring crimp frequency to thereby eliminate the need for manual measurements of crimp frequency.

It is a further object of the present invention to provide a novel method and apparatus which is adapted for on-line measurement of crimp frequency during the production of crimped tow.

It is yet another object of the present invention to provide novel apparatus for clamping and tensioning tow to remove secondary crimp therefrom during the measurement of the primary crimp frequency of the tow.

BRIEF DESCRIPTION OF THE DRAWINGS

These, as well as other objects and advantages of the present invention, will be explained with reference to the preferred embodiment of the present invention illustrated in the accompanying drawings, in which:

FIG. 8 is a schematic diagram illustrating one possible location of the crimp counter in an on-line operation for measuring crimp frequency;

FIG. 10 is a side view in elevation of the structure illustrated in FIG. 9; and

DETAILED DESCRIPTION

In order to elucidate the various objects and advantages of the present invention, the same will be described with reference to the preferred embodiment thereof, which relates to the measurement of the primary crimp frequency in a crimped tow. It will be appreciated, however, that the following description is intended to be illustrative and in no way limitative.

Figure 1:
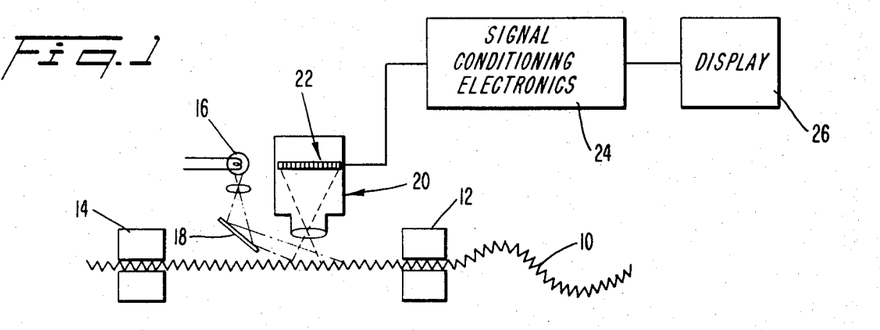
FIG. 1 is a schematic block diagram illustrating the general principles underlying the present invention.

The general principles underlying the present invention will first be explained with reference to the schematic block diagram of FIG. 1. Referring now to FIG. 1, a crimped tow line 10 generally has two types of crimp therein. The primary crimp lies within the plane of the tow and is not removed by slight tension on the tow. This primary crimp conventionally has a crimp frequency lying within the range of 10 to 16 crimps per inch, for example. In addition, the tow has a low frequency secondary crimp which is perpendicular to the plane of the tow and is easily removed by slight tension. This secondary crimp is illustrated in FIG. 1 in that portion of the tow 10 lying to the right of a clamp 12. Secondary crimp usually has a crimp frequency of about 1 crimp per inch, for example.

In order to measure the primary crimp frequency of the tow 10, sufficient tension is placed on the tow to remove the secondary crimp therefrom. The tension can be maintained on that portion of the tow to be measured by clamping it between a pair of clamps 12, 14.

In accordance with the present invention, the waviness of the tow caused by the crimp is utilized to produce a pattern of light reflections. The pattern of light reflections can be obtained by illuminating the tow in the longitudinal direction from one end thereof with light having a shallow angle of incidence with the tow. The crimps in the tow will reflect the light to produce alternate bright and shadowed areas on the tow. The illumination from a lamp 16 can be reflected by an appropriately positioned mirror 18 to strike the tow 10 at the proper angle to produce the desired pattern. The optimum angle of incidence will produce the sharpest contrast between bright and shadowed areas and will be determined, at least in part, by the amplitude of the crimps in the tow.

The portion of the tow which is illuminated by the light from the lamp 16 can be electro-optically scanned to detect the number of bright and shadowed areas in a unit length of the tow. This scanning can be carried out by means of a reticon camera 20 having a photodiode array 22. By way of example, the photodiode array may comprise a matrix arrangement with 1,000 photodiodes in each row and each column of the array. In a well known manner, the reticon camera 20 electronically scans the photodiode array to produce an output signal indicative of the light pattern imaged on the photodiode array. In the context of the present invention, the output signal from the reticon camera will be a signal which is amplitude modulated in accordance with the bright and shadowed areas on the tow. The frequency of this amplitude modulated output signal is a function of the crimp frequency of the tow, and is therefore indicative of the crimps per unit length of the tow. The output signal from the reticon camera 20 can be processed in suitable signal conditioning electronics 24 to determine its frequency, and the measured frequency can be recorded by means of a display 26 to thereby provide an indication of crimp frequency.

It will be apparent that other devices can be used to scan the light pattern on the tow to obtain an amplitude modulated signal. For example, a single photodiode can be moved relative to the tow in the longitudinal direction thereof to obtain such a signal.

To eliminate the need for scaling circuitry and thereby reduce the complexity of the single conditioning electronics, it is desirable to position the reticon camera 20 at a distance from the tow 10 such that a unit length of the tow is imaged on the photodiode array 22 of the camera. For example, in a camera having optics which produce an image magnification of approximately one, the camera lens can be placed about one inch from the tow 10 to thereby image one inch of the tow on the photodiode array 22. With such a short distance between the camera lens and the tow, the camera can be operated with a very low aperture setting, e.g., f22, thus making focusing of the camera non-critical. The output signal obtained with one scan of the photodiode array in the longitudinal direction of the tow will provide a direct indication of the number of crimps per inch in the portion of the tow imaged on the array.

Figure 2:
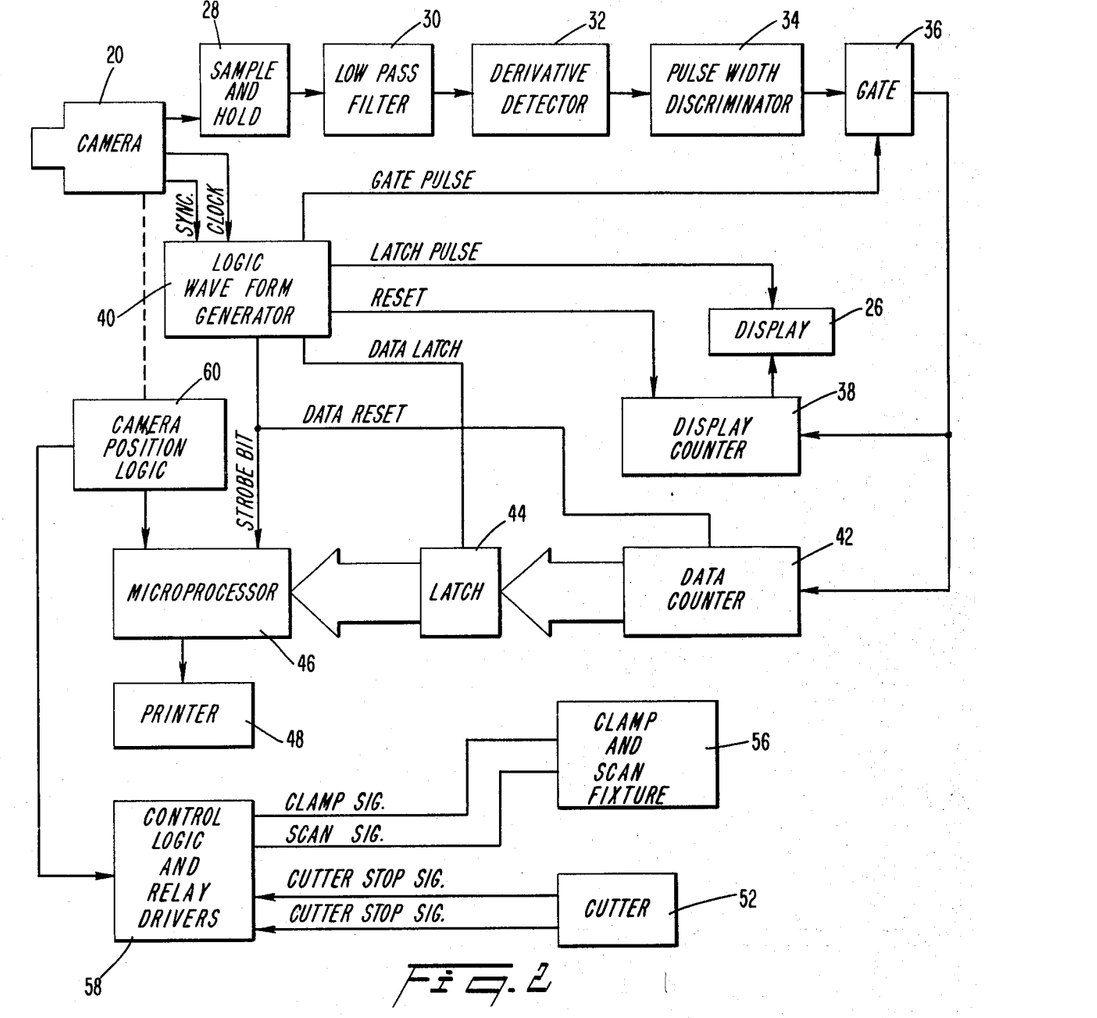
FIG. 2 is a block diagram of the signal conditioning electronic circuit used to measure the primary crimp frequency of crimped tow.
Figure 3:
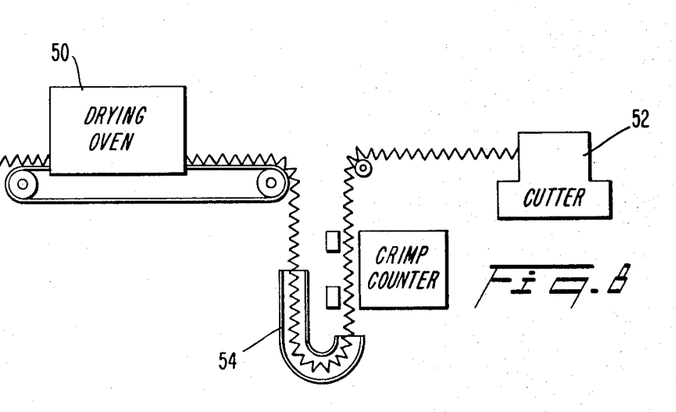
FIGS. 3a through 3c are signal diagrams illustrating the output signals produced by the reticon camera, sample and hold circuit and low pass filter of the circuit illustrated in FIG. 2.
Figure 3A:
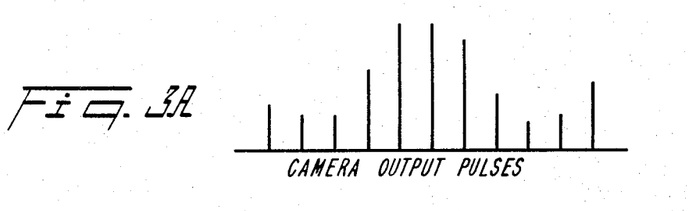

One example of suitable signal conditioning electronics for processing the output signal of the reticon camera to thereby obtain a measurement of the crimp frequency of the tow is illustrated in FIG. 2. The internal electronics (not shown) of the reticon camera sequentially connects each photodiode in the photodiode array 22 to an output terminal of the camera to thereby electro-optically scan the image on the photodiode array. The scanning rate is determined by the internal clock of the reticon camera. The output signal of the camera consists of a series of pulses, such as those illustrated in FIG. 3a. The amplitude of each pulse is proportional to the intensity of the light incident on the particular photodiode in the array at the time that it is scanned.

Figure 3B:
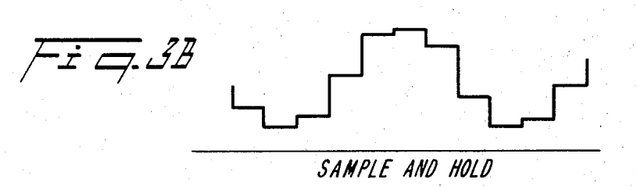

The width of each output pulse in the reticon camera output signal is relatively narrow in comparison with its repetition rate, resulting in a relatively low energy level of signal intelligence. For example, if the reticon camera produces 1,000 output pulses per scan and the individual rows or columns of diodes are scanned at an internal rate of approximately 17 KHz, each pulse will be about 0.6 microsecond wide and a new pulse will occur approximately every 60 microseconds. In order to increase the signal-to-noise ratio of this output signal, the signal is fed to a sample and hold circuit 28. The sample and hold circuit 28 samples the output signal of the camera 20 at the peak of each pulse and stores this peak value until the peak of the next pulse is detected. The sample and hold circuit 28 thus produces an output signal such as that illustrated in FIG. 3b.

Figure 3C:
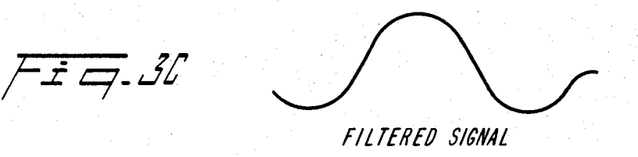

The output signal of the sample and hold circuit is passed through a low pass filter 30 to smooth the signal, resulting in a tow contour signal such as that illustrated in FIG. 3c.

Figure 4:
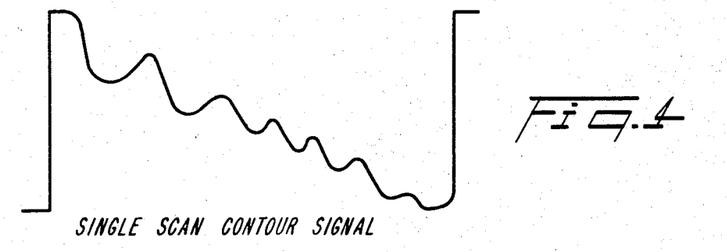
FIG. 4 is a signal diagram illustrating the contour signal produced during one scan of the crimped tow.

An example of a tow contour signal produced by a single scan of the photodiode array 22 in the reticon camera 20 is illustrated in FIG. 4. It can be seen that the contour signal includes a number of peaks which correspond to the bright areas in the light pattern imaged on the photodiode array, and a number of troughs, or valleys, corresponding to the shadowed areas in the light pattern. In addition to the peaks and troughs corresponding to the waviness of the tow, it will be noted that a ramp or saw tooth type of modulation is also superimposed on the contour signal. This modulation is a result of the unequal illumination of the tow sample produced by illuminating the sample from one end only, a necessary condition for obtaining the light pattern of bright and shadowed areas.

Figure 5:
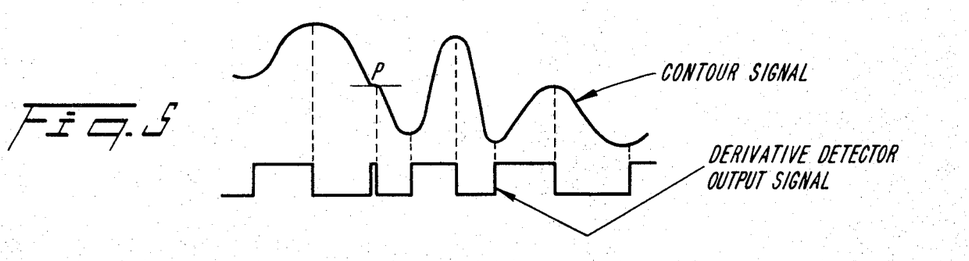
FIG. 5 is a signal diagram illustrating the derivative signal produced by the derivative detector of the circuit illustrated in FIG. 2.

In order to negate the effects of the saw tooth modulation, the signal conditioning electronics includes a derivative detector 32 which is responsive to the derivative of the tow contour signal. The derivative detector 32 produces a binary output signal having a state which corresponds on the polarity of the derivative of the tow contour signal, as illustrated in FIG. 5. The derivative detector output signal changes state each time the slope of the tow contour signal is zero, to thereby define both the peaks and troughs of the crimp in the tow.

The tow may contain very small perturbations which would not normally be visually detected as a crimp but which may nevertheless produce an inflection in the tow contour signal and a change in state of the square wave output signal from the derivative detector 32. One such inflection in the contour signal is illustrated at point P in FIG. 5. The narrow pulse produced in the derivative detector output signal as a result of this inflection could produce a false indication of crimp. In order to avoid errors due to small perturbations in the crimped tow, the derivative detector output signal is presented to a pulse width discriminator 34 which eliminates derivative detector output pulses having less than a predetermined minimum width, to thereby enable detection of only those pulses in the derivative detector output signal which relate to the true peaks and troughs of the tow crimp.

In addition to the elimination of narrow width pulses in the derivative detector output signal, it is also necessary to disregard the first inflection point on the tow contour signal which occurs at the beginning of each scan of the tow. This inflection point is a result of the saw tooth modulation imposed on the signal rather than a crimp in the tow, and therefore must be disregarded. The elimination of the pulse in the derivative detector output signal corresponding to this inflection in the tow contour signal is accomplished by gating out a small portion of the beginning and end of each scan, by means of a window gate 36. The distance between the reticon camera 20 and the tow 10 can be adjusted accordingly so that the portion of the scan signal which is passed by the gate 36 will correspond with the scan of a unit length of the tow.

The square wave signal passed by the gate 36 is presented to a display counter 38. The display counter is responsive to the pulses in the gated portion of the derivative detector output signal, and controls the display 26 to provide an indication of the number of crimps per unit length in the crimped tow 10. For example, the display counter 38 can be responsive to the falling edge of each pulse in the gated portion of the derivative detector output signal to count the number of pulses in the signal and transmit the number counted to the display 26.

The display 26, the gate 36, and the display counter 38 are synchronized with each scan of the photodiode array 22 in the reticon camera 20 by means of a logic waveform generator 40. The waveform generator 40 is responsive to the clock and sync signals generated initially by the reticon camera 20 to produce a gate pulse, a reset pulse and a latch pulse for control of the gate 36, the display counter 38 and the display 26, respectively.

Figure 6:
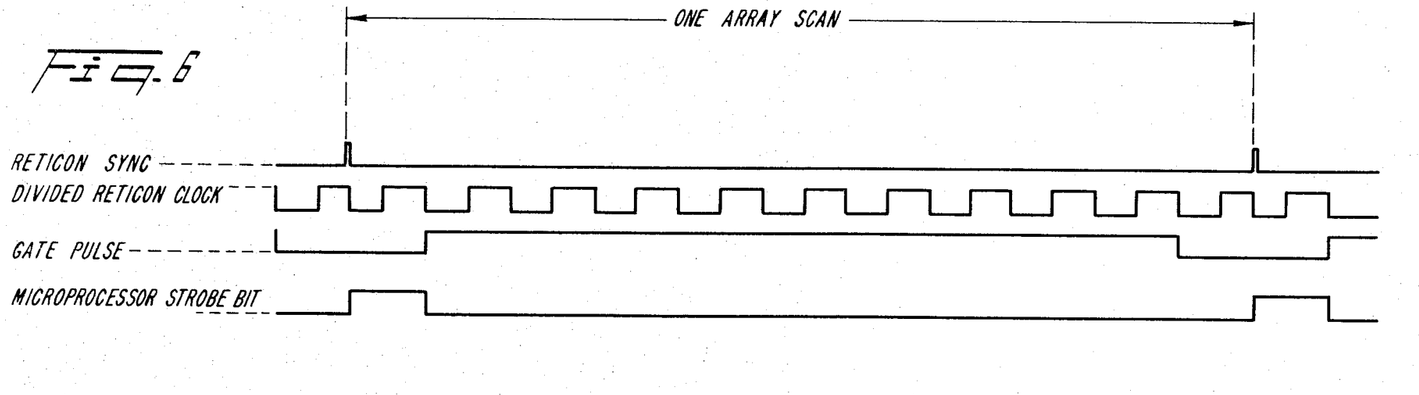
FIG. 6 is a timing diagram for the input and output signals of the logic wave form generator of the circuit illustrated in FIG. 2.
Figure 7:
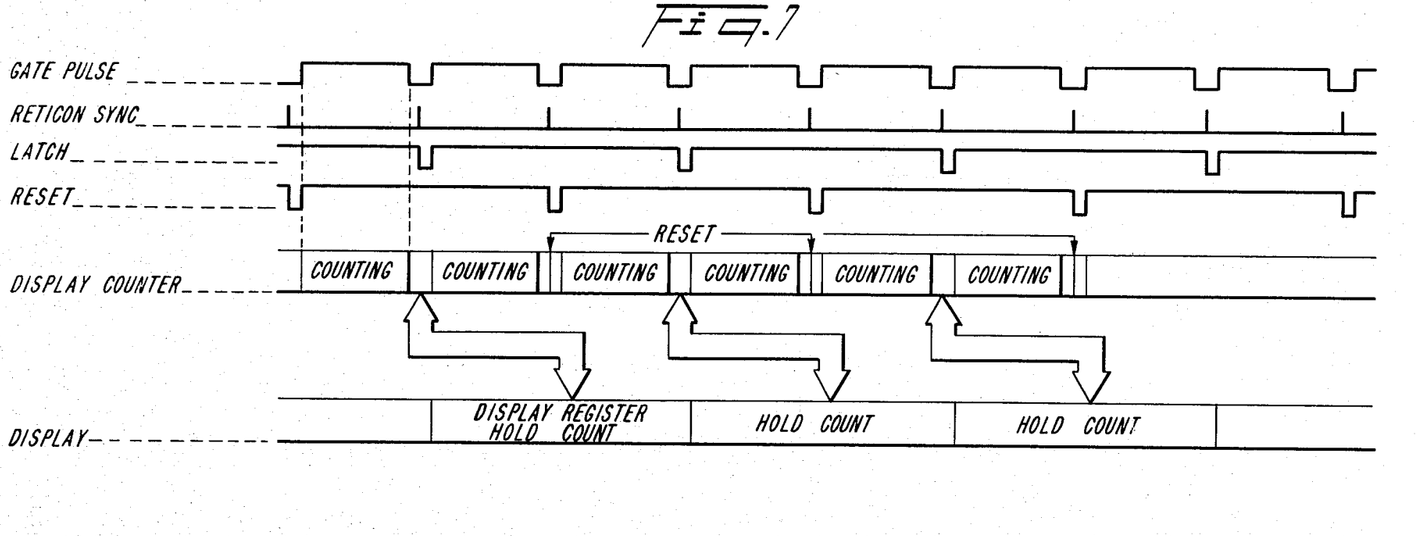
FIG. 7 is a timing diagram of the input and output signals of the display counter in the circuit illustrated in FIG. 2.

The timing diagrams of FIGS. 6 and 7 illustrate the relationship of the input and output pulses of the waveform generator 40. The frequency of the reticon clock signal can be divided in the waveform generator 40 to provide a suitable timing signal. The reticon sync signal defines the beginning and end of each diode array scan. The sync and divided clock signals can be used to provide a gate signal having a duration less than the time period between successive sync signals, to thereby cut off the beginning and ending portion of each scan signal. The gate pulse also serves to control the length of the counting period of the display counter 38.

Since a conventional reticon camera is capable of scanning the light image at a relatively rapid rate, e.g., approximately 17 KHz, it may not be necessary or desirable to update the information presented by the display 26 with every scan of the light image. For example, if the reticon camera operates at a scan rate of approximately 17 KHz, a complete scan across the photodiode array will occur every 60 milliseconds. If it is desirable to update the information on the display 26 only every 120 milliseconds, the waveform generator 40 can produce a latch pulse with every other sync pulse from the reticon camera, to control the display 26. A reset pulse for resetting the display counter 38 would be produced at the alternate sync pulses.

Thus, after the derivative detector output signal corresponding to one diode array scan has been passed to the display counter 38 by the gate 36, the waveform generator 40 will generate a latch pulse to actuate the display 26, causing the number of crimps detected in the first scan to be recorded on the display. The display counter 38 will continue to count the pulses corresponding to the second array scan and will then be reset by a pulse from the waveform generator 40. After the completion of the first scan following the reset pulse, another latch pulse will be applied to the display 26 to update the information on the display by recording the number of crimps counted in the third scan of the photodiode array. The gate 36, display counter 38, and the display 26 will continue to function in the manner to display the number of crimps counted in each odd numbered scan of the photodiode array. It will be appreciated that the ratio of sync pulses to latch or reset pulses can be varied to change the rate at which the information on the display 26 is updated.

In addition to the display 26 for recording the latest measured value of the crimp frequency, the crimp counter can include suitable circuitry for statistically processing the data which is obtained over a number of scans of the crimped tow. This circuitry can include a second data counter 42 which is also responsive to the derivative detector output signals passed by the gate 36. The number of crimps counted by the data counter 42 can be presented to a latch 44 to be stored therein. In contrast to the display counter 38 and the display 26, the data counter 42 can be reset on the occurrence of each sync signal from the camera 20. Likewise, the latch 44 can be actuated with each sync signal to thereby store the number of crimps counted during each scan of the tow.

Each count stored in the latch 44 can be presented to a suitable conventional microprocessor 46. The same signal which is used to reset the data counter 42 can also be applied to the microprocessor 46 as a strobe bit to thereby load the data stored in the latch 44 into the microprocessor at the beginning of each new scan of the array. The microprocessor 46 can be programmed to tatistically evaluate the data obtained over a number of cans of the tow. For example, it can provide the measured crimp frequency for each scan along the width of he tow, as well as the mean, the standard deviation and he ratio of the standard deviation to the mean of the counts obtained across the width of the tow. This information can be recorded by a printer 48 for subsequent use.

A crimp counter constructed in accordance with the present invention is particularly suitable for use on-line during the fabrication of fibers and textiles since it is fully automatic and does not require any type of operator intervention which may slow the fabrication process. As illustrated in FIG. 8, one possible location for the crimp counter is between the drying oven 50 and the tow cutter 52 in the fabrication line. The crimp counter is preferably located just downstream of the "J Box" 54 which provides varying amounts of material storage intermediate the oven 50 and the cutter 52.

There are certain practical considerations which must be implemented when using the crimp counter for an on-line type of operation. During counting, the tow must be clamped in a stationary position and stretched so as to remove the secondary crimp. The tow is conventionally about 10 inches wide and is composed of approximately 30 sub-tow sections extending in the longitudinal direction of the tow. Since the reticon camera preferably images a unit length of the tow onto the photodiode array, it is not possible to scan the entire width of the tow in a single scanning operation of the camera. Therefore, it is desirable to scan the camera in a transverse direction across the width of the tow and perform a number of longitudinal electro-optical scanning operations by the camera in order to obtain a large number of individual crimp frequency readings for statistical evaluation.

In order to implement these considerations, the reticon camera 20 is preferably mounted on a clamp and scan fixture 56 which is capable of clamping the tow in a stationary position, applying the necessary longitudinal tension thereto, and scanning the camera in a transverse direction across the width of the clamped tow. The operation of the clamp and scan fixture 56 can be controlled by means of a control logic circuit 58. The control logic circuit 58 can control the operation of the clamp and scan fixture 56 by means of relay drivers, for example. The control logic 58 preferably controls the operation of the clamp and scan fixture 56 in conjunction with the operation of the cutter 52. When the feed rolls in the cutter are stopped to enable a predetermined length of tow to be cut, the cutter 52 sends a signal to the control logic 58 to indicate that the feeding of the tow has been interrupted. Upon receipt of such a signal, the control logic 58 sends a clamp signal to the clamp and scan fixture 56, actuating the fixture to clamp the tow in a stationary position and apply tension thereto. While the tow is clamped in the stationary position, the control logic 58 supplies a disabling signal to the cutter to inhibit the cutter feed rolls from attempting to feed more tow through the cutter during the clamping and scanning operation.

During the transverse scanning of the reticon camera 20, the position of the camera is detected by a camera position logic circuit 60. This logic circuit provides a signal to the control logic circuit 58 to indicate the position of the camera during the scanning operations. The control logic 58 is responsive to this signal to control the transverse movement of the camera across the width of the tow. The camera position logic circuit 60 can also supply a signal to the microprocessor 46 for use in the statistical evaluation of the frequency measurements.

By way of example, if the reticon camera performs a complete longitudinal scanning operation across the photodiode array every 60 milliseconds, approximately 16 crimp frequency count cycles will be completed each second. By scanning the reticon camera 20 across the width of a 10 inch tow in 10 seconds, a total of 167 crimp frequency readings will be obtained during the scan, to net approximately 16 to 17 readings per inch of the tow.

Figure 9:
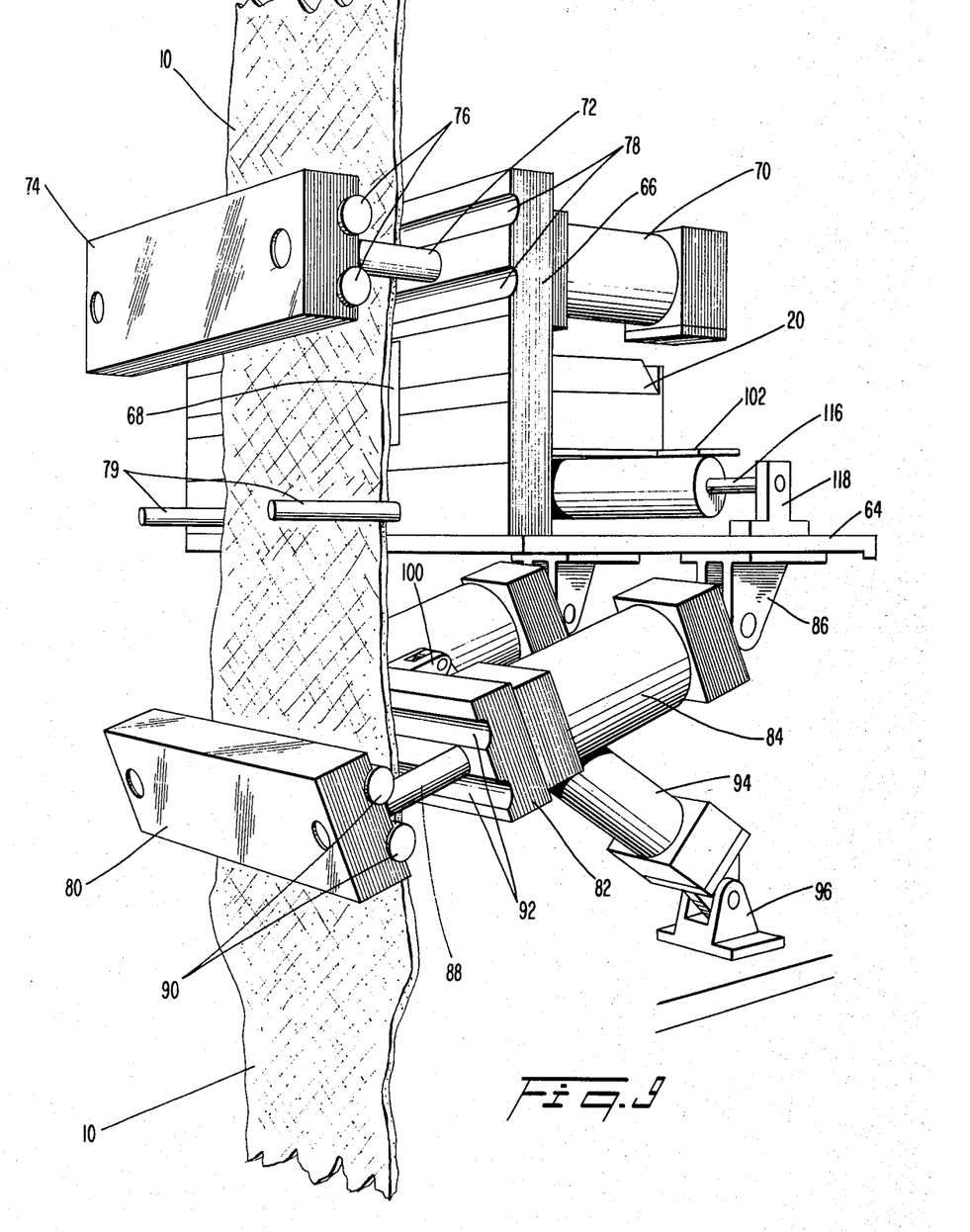
FIG. 9 is a perspective view of the preferred structure for clamping, tensioning and scanning the crimped tow during the measurement of crimp frequency.
Figure 11:
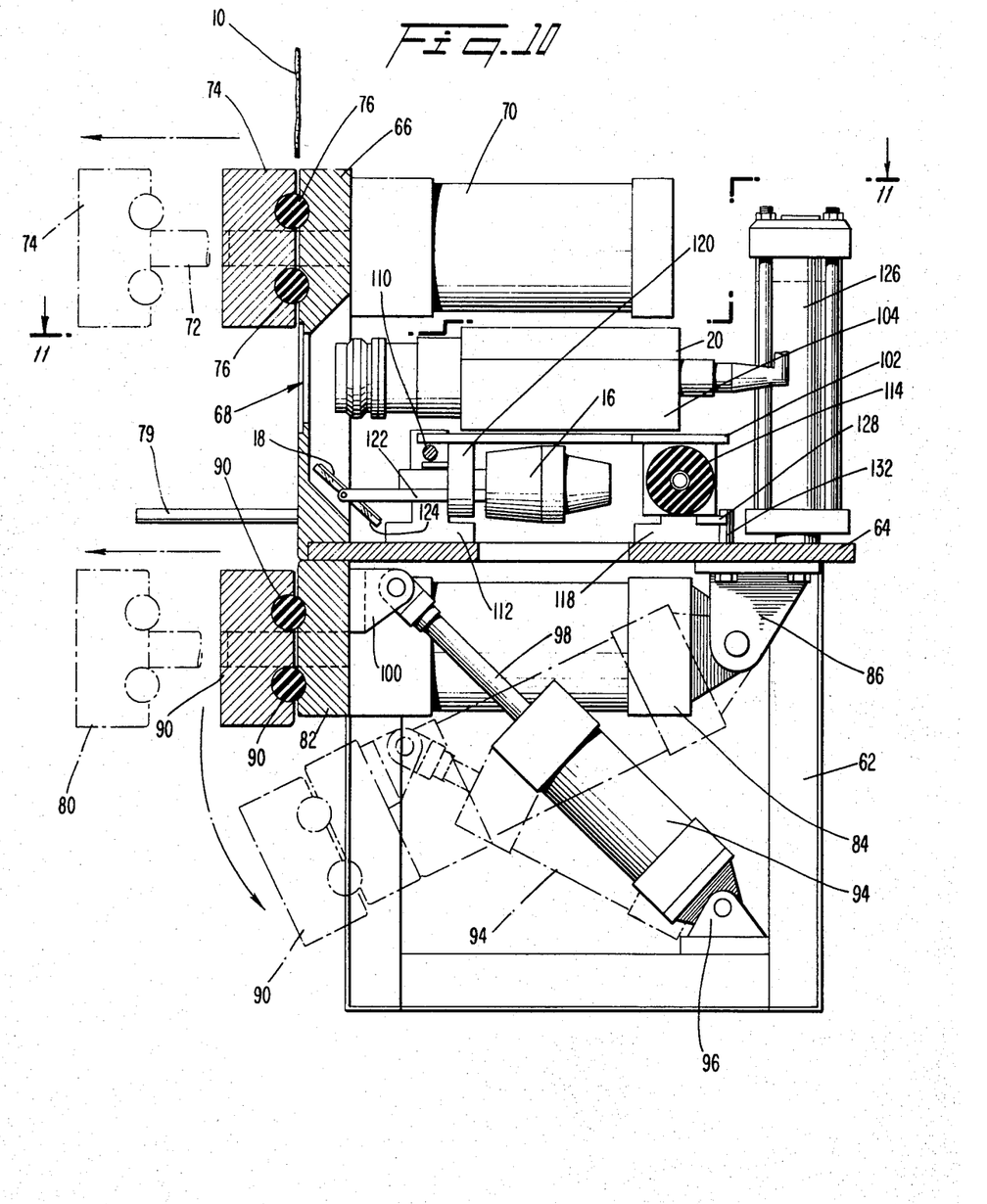
FIG. 11 is a top view in elevation of the structure illustrated in FIG. 9.

The preferred embodiment of the clamp and scan fixture 56 will now be described with reference to FIGS. 9-11. Referring particularly to FIG. 10, the fixture includes a stand 62 supporting a base plate 64. A front plate 66 is securely mounted in an upstanding position at one end of the base plate 64. The front plate 66 has a window 68 therein through which the tow can be viewed by the camera 20. A pair of hydraulic cylinders 70 are mounted near the top of the front plate 66 on one side thereof. The connecting rods 72 for the reciprocating pistons of the hydraulic cylinders 70 extend through apertures in the front plate 66 and are connected to an upper tow grip bar 74. Through actuation of the hydraulic cylinders 70, the upper tow grip bar 74 is translatable between a retracted position, illustrated in solid lines in FIG. 10, and an extended position, illustrated in broken lines. A pair of elongated rods 76 are mounted on that surface of the tow grip bar 74 which faces the front plate 66. When the tow grip bar 74 is in its retracted position, the elongated rods 76 are received in a pair of longitudinal grooves 78 in the outer surface of the front plate 66. The elongated rods 76 are preferably made of rubber or a similar material having a high coefficient of friction to thereby securely clamp the tow 10 between the front plate 66 and the gripper bar 74 when the bar is pulled to its retracted position and the rods 76 are received within the grooves 78. A pair of spaced guide rods 79 extend from the front plate 66 and limit transverse movement of the tow 10 as it is fed between the front plate 66 and the gripper bar 74.

A second clamping mechanism is formed by a lower gripper bar 80 and a lower tow plate 82. The lower tow plate 82 is securely mounted on one end of each of a pair of hydraulic cylinders 84. The other ends of the cylinders 84 are pivotally attached to the bottom plate 64 by means of a suitable cylinder bracket 86.

The connecting rods 88 of the lower cylinders 84 extend through apertures in the lower tow plate 82 and are connected to the lower gripper bar 80 in the same fashion as the upper gripper bar 74 is attached to the hydraulic cylinders 70. The lower gripper bar 80 also includes a pair of elongated rods 90 which are received in grooves 92 in the lower tow plate 82. The lower gripper bar 80 is translated between a retracted position, illustrated in solid lines in FIG. 10, and an extended position, illustrated in broken lines, by means of the hydraulic cylinders 84, to securely clamp the tow 10 between the lower gripper bar 80 and the lower tow plate 82.

The pivotal connection of the hydraulic cylinders 84 to the base plate 64 provides for tensioning of the tow 10 when it is clamped by each of the upper and lower gripper bars 74, 80. The tensioning force is supplied by a hydraulic cylinder 94, pivotally connected at one end thereof to the base stand 62 by means of a cylinder bracket 96. The connecting rod 98 of the cylinder 94 is pivotally connected to the lower tow plate 82 by means of a suitable clevis mount 100 or the like. When the connecting rod 98 is in its extended position, the lower gripper bar 80, the lower plate 82 and the cylinders 84 will be in the position shown in solid lines in FIG. 10, with the upper surface of the lower tow plate 82 abutting against the base plate 64. When the hydraulic cylinder 94 is actuated to retract the connecting rod 98, the lower gripper bar 80, the lower tow plate 82, and the hydraulic cylinders 84 will be pivoted about the connection point of the cylinders 84 and the cylinder brackets 86, in a counter-clockwise direction as viewed in FIG. 10, to occupy the position illustrated in broken lines in FIG. 10.

The camera 20 is supported on a generally T-shaped mounting plate 102 by means of a suitable bracket 104. To enable the distance between the camera lens and the tow clamped against the front plate 66 to be varied, the camera bracket 104 is secured to the mounting plate 102 by means of screws or bolts 106 extending through elongated slots 108 in the camera bracket (FIG. 11).

The narrow end of the mounting plate 102 near the camera lens rests on a slide bar 110 mounted on the bottom base plate 64 by means of a suitable mounting bracket 112. A hydraulic cylinder 114 is attached to the underside of the mounting plate 102 at the wider portion thereof. The cylinder 114 has a connecting rod 116 at each end thereof, and these connecting rods are respectively connected to brackets 118 mounted on either side of the base plate 64.

A lamp support bracket 120 is attached to the underside of the mounting plate 102 near the front end thereof. The lamp 16 is securely fastened to the support bracket 120 and positioned so as to project light in a direction substantially parallel to the viewing axis of the camera 20. A pair of mirror support rods 122 are connected at one end thereof to the support bracket 120 and have a mirror support plate 124 pivotally attached between them at the other end thereof. The mirror 18 is mounted on the mirror support plate 124 and can be pivoted to a proper position to reflect light from the lamp 16 through the window 68 onto tow clamped against the front plate.

A suitable fluid reservoir 126 can be mounted on the base plate 64 to supply hydraulic fluid to the cylinders 70, 84 and 114.

A cam plate 128 can be provided on the scanning hydraulic cylinder 114, or alternatively on the mounting plate 102. The cam plate 128 has a number of detents 130 which cooperate with a pin 132 to lock the camera 20 in predetermined positions along the width of the tow. Five such positions are designated in FIG. 11. The locking pin 132 can be spring biased into engagement with the cam 128. Alternatively, it can be solenoid actuated or otherwise moved in response to control signals.

In the operation of the clamp and scan fixture, the crimped tow 10 is fed between the upper gripper bar 74 and the front plate 66, and between the lower gripper bar 80 and the lower tow plate 82. Lateral movement of the crimped tow during feeding thereof is constrained by the guide rods 79. At an appropriate time during the fabrication of the tow, such as when the cutter feed rolls momentarily interrupt feeding of the tow, for example, the upper cylinders 70 and lower cylinders 84 are actuated to bring each of the upper and lower gripper bars 74, 80 to their retracted positions to clamp the tow between the front plate 66 and the longitudinal rods 76 of the upper gripper bar 74, and between the lower tow plate 82 and the longitudinal rods 90 of the lower gripper bar 80. The tensioning cylinder 94 is then actuated to pivot the lower cylinders 84, the lower tow plate 82, and the lower gripper bar 80 as a unit in a direction away from the upper gripper bar 74 to thereby apply tension to the tow clamped between the two gripper bars and remove any secondary crimp therein. The application of hydraulic fluid to the tensioning cylinder 94 can be controlled by a suitable conventional regulating mechanism (not shown) to apply a predetermined force to the tow clamped by the fixture. The regulator is preferably variable, to enable the tension to be varied at different temperatures or for different types of tow having different weights.

Once the tow has been clamped and tensioned in this manner, the lamp 16 is energized and the light produced thereby is reflected by the mirror 18 through the window 68 onto the clamped tow at a shallow angle of incidence to produce a light pattern of bright and shadowed areas thereon. This light pattern can then be scanned by the reticon camera 20 to produce and indication of the crimp frequency of the tow, as described previously.

At the initiation of the scanning operation, the scanning cylinder 114 is preferably at one of its extreme positions to thereby dispose the camera proximate a side edge of the tow. During the scanning operation, the hydraulic cylinder is actuated to traverse the camera across the width of the tow and thereby provide a number of indications of the crimp frequency of the tow.

Once the scanning operation has been completed, the hydraulic cylinders 70 and 84 can be actuated to release the tow. The disabling signal can be removed from the cutter mechanism to thereby enable the cutter feed rollers to resume feeding of the tow and thereby present a new section of the tow to the clamp and scan fixture for subsequent measurements of crimp frequency. After the tow has been released by the gripper bars, the tensioning cylinder 94 can be actuated to return the lower gripper bar 80 and lower tow plate 82 to their uppermost position in preparation for the next clamping and tensioning operation.

From the foregoing, it will be appreciated that the present invention provides a novel method and apparatus for automatically measuring the crimp frequency of crimped tow. By utilizing the waviness of the tow to reflect light and produce a pattern of bright and shadowed areas and then optically evaluating the light pattern, the crimp frequency of the tow can be measured in a rapid and economical manner. The requirement for tedious operations performed by manual inspection is eliminated. Furthermore, the automatic operation of the present invention provides for instantaneous on-line measurement of crimp frequency, to thereby enable more effective quality control to be maintained over the fabrication of the tow.

The present invention may be embodied in other specific forms without departing from the spirit or essential characteristics thereof. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. Apparatus for measuring the crimp frequency of a crimped tow, comprising:
   means for illuminating the tow in the longitudinal direction of the tow with light having a shallow angle of incidence such that the crimps in the tow reflect the light to produce alternate bright and shadowed areas on the tow;
   means for optically scanning the illuminated portion of the tow and producing an output signal which is amplitude modulated in accordance with the pattern of bright and shadowed areas on the tow;
   means for measuring the frequency of said output signal; and
   means for displaying the measured frequency as a function of crimps per unit length of the tow.

2. The apparatus of claim 1 wherein said scanning means comprises a photodiode array and means for sequentially transmitting the output signal from each photodiode in the array to an output terminal to produce said amplitude modulated output signal.

3. The apparatus of claim 2 wherein said photodiode array and said transmitting means are included in a reticon camera.

4. The apparatus of claim 3 wherein said reticon camera is positioned a predetermined distance from the web such that a unit length of the web is imaged on said photodiode array.

5. The apparatus of claim 2 wherein the output signals from the photodiodes are transmitted as pulses, and further including sample and hold means for detecting the peak value of each output pulse and storing the detected value until the peak value of the next subsequent pulse is detected.

6. The apparatus of claim 1 wherein said frequency measuring means includes means for detecting the derivative of said amplitude modulated output signal and providing an indication whenever the derivative of the output signal changes polarity, and means for counting the number of changes of polarity of the derivative in a unit time period.

7. The apparatus of claim 6 wherein said derivative detecting means produces a square-wave output signal to provide an indication of the polarity of the derivative, and wherein said frequency measuring means further includes means for preventing pulses in said square-wave signal that have less than a predetermined minimum width from being counted by said counting means.

8. The apparatus of claim 7 further including means for generating a window gate pulse to inhibit the beginning and ending portions of the square-wave signal for each scan of the tow from being detected by said counting means.

9. The apparatus of claim 1 further including means for applying longitudinal tension to the tow to thereby remove secondary crimp in the tow.

10. The apparatus of claim 9 wherein said tensioning means includes a pair of clamps for clamping the tow on either side of the portion to be illuminated, and means for moving one of said clamps away from the other of said clamps generally in the longitudinal direction of the tow to thereby apply tension to the tow.

11. The apparatus of claim 10 wherein one of said pair of clamps comprises a first plate, a first gripper bar and first cylinder means for translating said first gripper bar into and out of engagement with said first plate, the other one of said clamps comprises a second plate, a second gripper bar and second cylinder means for translating said second gripper bar into and out of engagement with said second plate, wherein said second plate, said second gripper bar and said second cylinder means are pivotable as a unit with respect to said one clamp.

12. The apparatus of claim 11 wherein said moving means comprises third cylinder means for pivoting said second plate, said second gripper bar and said second cylinder means away from said one clamp.

13. The apparatus of claim 1 further including means for moving said scanning means in the transverse direction across the width of the tow.

14. A method for measuring the crimp frequency of a crimped tow, comprising the steps of:
   illuminating the tow in the longitudinal direction of the tow with light having a shallow angle of incidence such that the crimps in the tow reflect the light to produce alternate bright and shadowed areas on the tow;
   optically scanning the illuminated portion of the tow in the longitudinal direction to detect the bright and shadowed areas thereon; and p1 counting the number of bright ad shadowed areas detected per unit length of the tow.

15. The method of claim 14 wherein said scanning step includes imaging the illuminated portion of the tow on a photodiode array and sequentially sensing the output signal of each photodiode in the array.

16. The method of claim 15 wherein the output signals of the photodiode array produce an amplitude modulated signal, and said counting step includes the steps of detecting the derivative of the amplitude modulated signal and counting the number of changes in polarity of the detected derivative.

17. The method of claim 15 further including the step of applying longitudinal tension to the tow during the illuminating and scanning steps to remove secondary crimp from the tow.

18. The method of claim 14 further including the step of scanning in the transverse direction of the tow to obtain a number of measurements of crimp frequency across the width of the tow.

19. A method according to claim 14 which comprises measuring the crimp frequency of a crimped tow having a crimp frequency within the range 4–30.

20. A method according to claim 19 which comprises measuring the crimp frequency of a crimped tow having a crimp frequency within the range 10 to 16.

* * * * *